H. E. T. HAULTAIN.
WEIGHT RECORDING MECHANISM.
APPLICATION FILED OCT. 29, 1910.

1,029,119.

Patented June 11, 1912.

WITNESSES:

INVENTOR.
H. E. T. Haultain
BY
Ridout & Maybee
ATTORNEY.

UNITED STATES PATENT OFFICE.

HERBERT E. T. HAULTAIN, OF TORONTO, ONTARIO, CANADA.

WEIGHT-RECORDING MECHANISM.

1,029,119.   Specification of Letters Patent.   Patented June 11, 1912.

Application filed October 29, 1910. Serial No. 589,760.

*To all whom it may concern:*

Be it known that I, HERBERT E. T. HAULTAIN, of the city of Toronto, in the Province of Ontario, Canada, have invented certain new and useful Improvements in Weight-Recording Mechanism, of which the following is a specification.

This invention relates to improvements in weight recording mechanism in which a disk is rotated in proportion to the movement of the load and in which an integrating wheel is driven by said disk and is moved relative thereto according to the load on the apparatus.

I find it desirable in a device of this character to make the weight recording mechanism independent of the oscillations of the weighing apparatus and independent of the rate of travel of the load. I attain this object by arranging the mechanism to record, not the depression of the weighing apparatus due to the load, but the amount of rotation of the integrating wheel per given unit of time.

This mechanism is arranged in detail substantially as hereinafter described and illustrated in the accompanying drawings in which—

Figure 1:
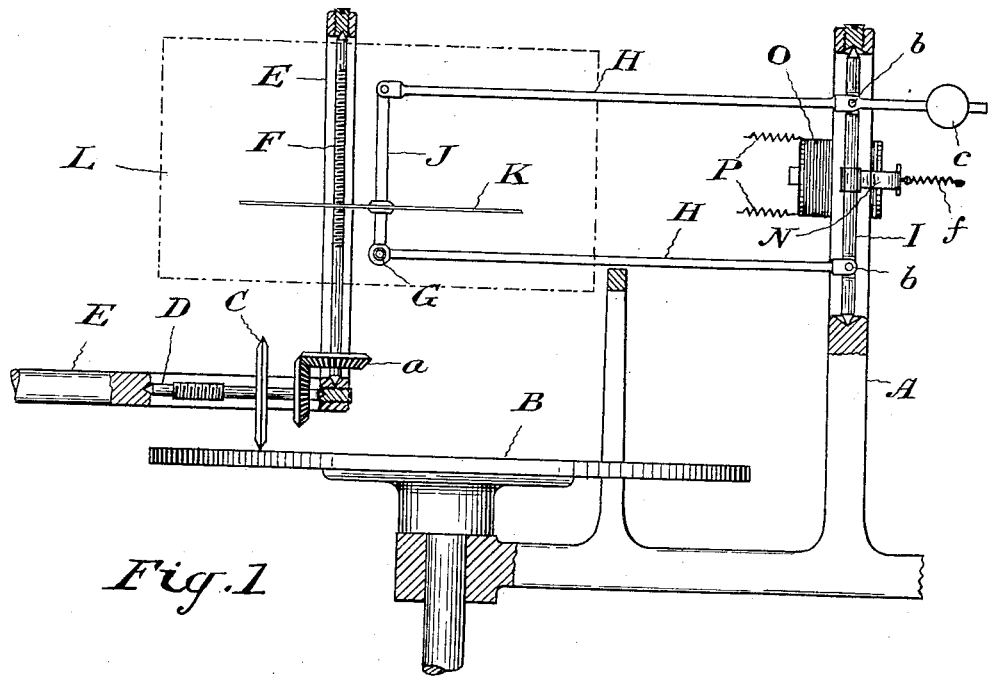
Figure 2:
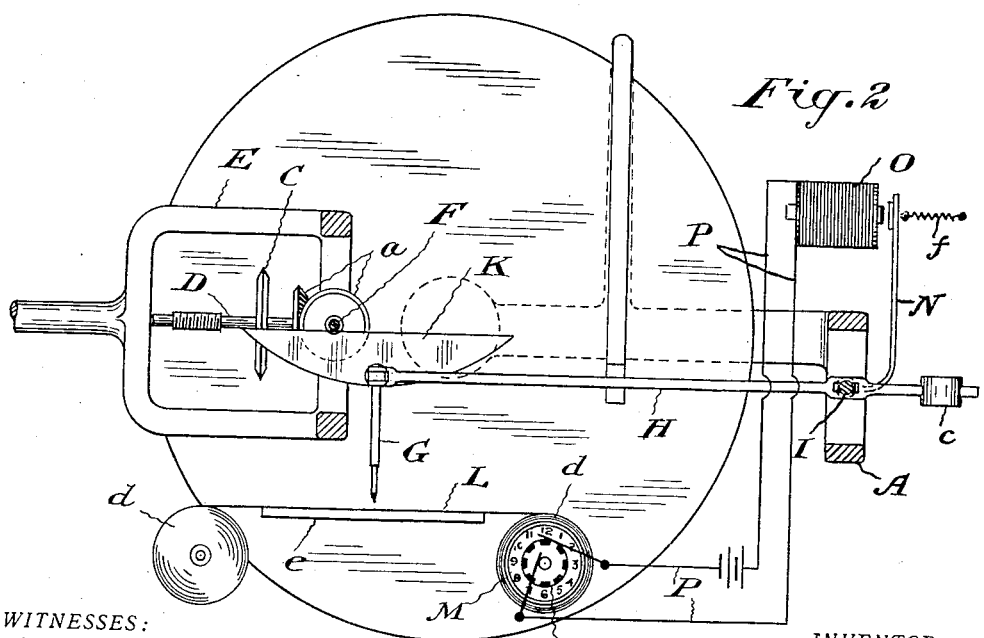

Figure 1 is a front elevation of parts of a weighing machine provided with my improved recording device. Fig. 2 is a plan view of the same parts.

In the drawings like letters of reference indicate corresponding parts in the different figures.

A is part of the frame of a suitable weighing machine.

B is a rotary disk suitably journaled in the frame so that it may be rotated to correspond with the travel of the load through the apparatus.

C is an integrating wheel carried by the spindle D journaled in the frame E. In a weighing apparatus such as described this integrating wheel is moved over the face of the disk B its position corresponding with the load on the machine at any given moment of time. I record the rotations of this integrating wheel on a clock driven chart through the medium of the parts I will now describe. Journaled in the frame E is the worm spindle F geared to the spindle D through the medium of the bevel gearing $a$. This worm spindle actuates a stylus G through the medium of the following mechanism. A pair of arms H are pivoted at $b$ on the spindle I which is journaled in the frame A parallel to the worm spindle F. A link J is pivotally connected with the other ends of the arms H and a parallel motion device is thus formed. Carried by the link J is a knife blade K transverse to the length of the worm spindle F and adapted to engage the worm thereon, as shown particularly in Fig. 2. The stylus G may be located in any suitable position on the plate K or the link J, but is preferably located at the pivot between the link J and one of the arms H.

One of the arms H is preferably extended beyond its pivotal connection with the spindle I and a counterbalancing weight $c$ is secured thereto for the purpose of counterbalancing the weight of the arms H, the link J and knife blade K and the stylus G. Opposite the point of the stylus is located the clock driven surface L. This I show as a web of paper drawn from one of the drums $d$ to the other through the medium of the clock M. Opposite the stylus the paper is backed by the tablet $e$.

The clock driven surface is preferably so located that when the knife blade K is in engagement with the worm spindle F the point of the stylus is out of contact with the clock driven surface, and so that when the point of the stylus is in contact with the clock driven surface it just clears the worm on the spindle F. The knife blade K is normally held in engagement with the worm spindle F by means of the spring $f$ secured at one end to a stationary part and at its other end to the armature N of the electromagnet O which armature is secured to the spindle I. It is evident that by energizing the electromagnet that the stylus may be thrown against the clock driven surface and the knife blade K withdrawn from an engagement with the worm spindle F, allowing the stylus to fall to its zero position. If, therefore, the electromagnet be energized periodically, say, at one minute intervals the stylus may be caused to regularly mark on the chart the height to which it has been raised during its period of engagement with the worm spindle and these marks thus form an accurate record of the amount of motion of the integrating wheel B at any given time. This record will evidently be unaffected by any oscillations of the weighing apparatus.

The circuit P of the electromagnet includes the commutator Q which is driven by the clock M and this makes and breaks the circuit at regular predetermined intervals. Obviously other means of periodically breaking the circuit may be employed.

What I claim as my invention is:

1. In a weight recording apparatus the combination of a transversely movable worm spindle rotatable to indicate the amount of material weighed; means for supporting a record surface; a stylus movable over said surface normally tending to maintain a zero position; a knife blade connected with the stylus transverse to the spindle and adapted to engage the worm thereon; and means for periodically disengaging the knife blade to permit the stylus to return to its zero position.

2. In weight recording apparatus the combination of a transversely movable worm spindle rotatable to indicate the amount of material weighed; means for supporting a record surface; a stylus movable over said surface normally tending to maintain a zero position; means whereby the stylus may engage the worm of the spindle in any position of the latter; and means for periodically disengaging the stylus to permit it to return to normal position.

3. In a weight recording apparatus the combination of a transversely movable worm spindle rotatable to indicate the amount of material weighed; means for supporting a record surface; a movable recording stylus normally tending to maintain a zero position; a knife blade connected with the stylus transverse to the spindle and adapted to engage the worm thereon; and means for periodically disengaging the knife blade to permit the stylus to return to its zero position.

4. In weight recording apparatus the combination of a transversely movable worm spindle rotatable to indicate the amount of material weighed; means for supporting a record surface; a movable recording stylus normally tending to maintain a zero position; means whereby the stylus may engage the worm of the spindle in any position of the latter; and means for periodically disengaging the stylus to permit it to return to normal position.

Toronto this 26th day of October, 1910.

HERBERT E. T. HAULTAIN.

Signed in the presence of—
D. S. TOVELL,
E. P. HALL.

Copies of this patent may be obtained for five cents each, by addressing the "Commissioner of Patents, Washington, D. C."